Aug. 22, 1950  D. D. LOWBER ET AL  2,520,011
IMAGE PROJECTOR FOR OPAQUE AND TRANSPARENT MATERIALS
WITH FORCED AIR VENTILATION SYSTEMS
Filed Aug. 30, 1947
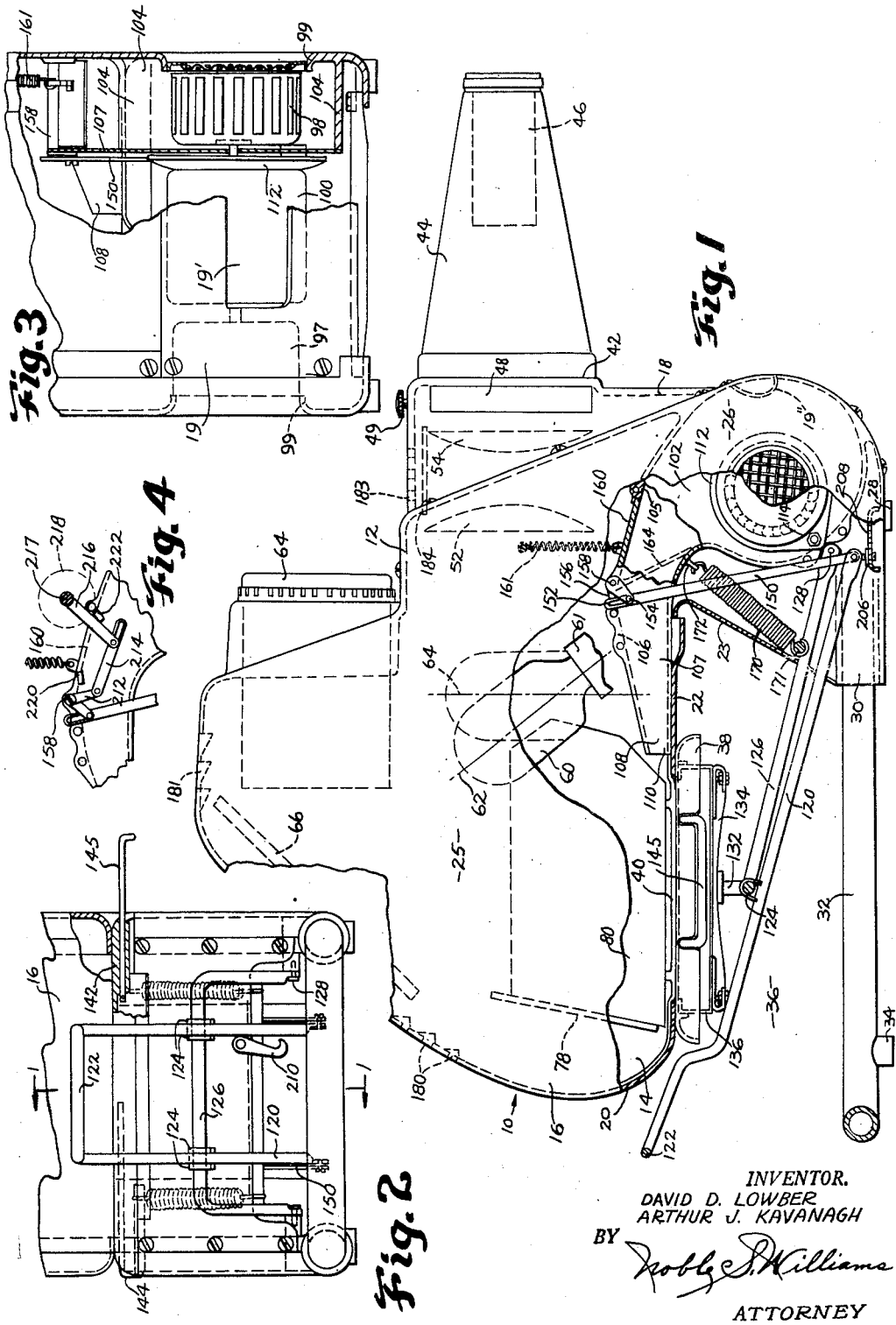
INVENTOR.
DAVID D. LOWBER
ARTHUR J. KAVANAGH
BY Noble S. Williams
ATTORNEY

Patented Aug. 22, 1950

2,520,011

UNITED STATES PATENT OFFICE 2,520,011

IMAGE PROJECTOR FOR OPAQUE AND TRANSPARENT MATERIALS WITH FORCED AIR VENTILATION SYSTEMS

David D. Lowber, Ann Arbor, Mich., and Arthur J. Kavanagh, Buffalo, N. Y., assignors to American Optical Company, Southbridge, Mass., a voluntary association of Massachusetts Application August 30, 1947, Serial No. 771,540

16 Claims. (Cl. 88—24)

This invention relates to projection devices and more particularly to projectors not only of the type adapted to project images of opaque material but also to projectors of the type adapted to selectively project images of opaque material or images of transparent lantern slides or the like onto a screen at a distance from the device.

Heretofore, in projectors of the types described, difficulty has been experienced in providing sufficient illumination particularly for the opaque projection system thereof and at the same time properly dissipating the heat generated, so that the material upon the supporting platen and being imaged upon the screen will not be injured or ignited by heat within the projector. In one such projector of earlier construction, forced air ventilating means in the form of a blower has been applied to an elevated rear portion of the projector housing and arranged to blow forwardly across the platen associated therewith. While this arrangement did not objectionably disturb the sheet material being placed upon the platen while the platen was open, since the material was generally inserted from the rear thereof, the blower nevertheless was located in an awkward position in the way of the operator and, being carried in such an elevated position added appreciable weight to this overhanging portion of the projector housing and sometimes caused objectionable vibration of the image being projected.

In another projector of earlier construction, a blower was employed near the lower front portion of the projector housing. While this was a better arrangement since the blower was not in the way of the operator and not carried on an elevated overhanging part of the projector housing, it nevertheless did not operate satisfactorily for, when the platen of the projector was opened to allow removal or insertion of sheet material the rearwardly directed air blast therefrom tended to blow the material away from the opening. Merely shutting off the blower as the platen was open did not solve the difficulty since the blower required time to stop rotating. Nor did providing a hand controlled air valve serve satisfactorily in such a projector since same had to be closed by the operator each time before the platen was opened, and had to be opened each time after the platen was closed. If the operator forgot to close the valve, the sheet material was blown away from the projector opening and if he forgot to subsequently open the valve after the material was inserted, the material was liable to be overheated. Furthermore, the provision of an air valve operated by movement of the platen was likewise found to be unsatisfactory since this arrangement did not shut off the air blast before the platen started to open. Thus none of the opaque or opaque and transparent projectors of earlier construction functioned as satisfactorily as might be desired.

It is, accordingly, an object of the present invention to provide in projectors of the types described a forced air ventilating system comprising a blower, or a pair of laterally spaced blowers, arranged to direct cooling air rearwardly across the platen of the projector and across material carried thereby during the operation of the projector, the system being arranged with suitable means to shut off the flow of cooling air toward the platen automatically prior to the opening of the platen and arranged to allow the air to blow across and cool the platen again as soon as the platen has returned to its closed position. In this manner, no air draft will be present at the projector opening to disturb the material being placed upon or removed from the platen.

It is also an object of the present invention to provide for projectors of the types described a cooling or ventilating system in the form of a blower or blowers arranged to direct cooling air across the projector platen during opaque projection and operator actuated means for opening the platen, this means being arranged to automatically move the air control valve means so as to prevent the flow of cooling air from the blower or blowers toward said platen at all times while the platen is being opened as well as while it remains in such open position.

It is a further object of the invention to provide in projectors of the types described and employing manually operable means for moving the platen, suitable means for automatically shutting off the air blast towards the platen opening and for directing the cooling air toward the transparent projection system or other interior portions of the projector housing at all times while the platen is displaced from its normally closed position.

An additional object of the invention is to provide for the ventilating system and control means described suitable means for maintaining the air valve control means in a position for directing the cooling air towards the transparent projection system of the projector continuously while this system is in operation.

Other objects and advantages of the invention will become readily apparent from a detailed description which follows when taken in conjunction with the accompanying drawings in which:

Fig. 1 is a side elevational view of a projector constructed and arranged for transparent and opaque projection and employing the present invention, parts of the projector being broken away to better show details thereof;

Fig. 2 is a rear elevational view of the lower portion of the device or instrument of Fig. 1;

Fig. 3 is a front elevational view of the lower portion of the device or instrument of Fig. 1, a portion thereof broken away to better show details of construction; and Fig. 4 is a fragmentary view showing a modified form of air valve holding means which may be employed in the instrument of the present invention.

Referring to the drawings in detail, there is shown in Fig. 1 a projector 10 adapted for both transparent and opaque projection. This projector comprises a housing 12 formed by a pair of rigid side plates 14 and 16 which are preferably formed of a die cast metal such as aluminum or zinc. These members are readily secured together in generally parallel spaced relation by a plurality of transversely extending plates such as front cover plate 18, a front auxiliary plate 19, a rear curved plate 20, a floor plate 22 and a lower shielding plate 23 which may be secured to the peripheral flanged edges of said side plates 14 and 16 by screws or the like to form a substantially rigid box-like main enclosure and an auxiliary enclosure projecting downwardly from the front portion thereof.

Each side plate 14 and 16 comprises a main body portion 25 having a horizontally disposed lower edge and a lower portion 26 arranged to support the front end of the projector upon resilient pads 28. Near the rear lower corners of each lower portion 26 is formed an integral lug or boss 30 into which may be fitted and secured an end of a U-shaped frame member 32 which carries resilient pads 34 for supporting the rear end of the projector. The U-shaped frame 32 is thus spaced from the lower edges of the main portions 25 of the side plates 14 and 16 to thereby provide a free and unobstructed space 36 of ample size for free movement of a platen 38. In this space the platen is movably arranged so as to support objects such as sheet material, books or the like for opaque projection in an operative position beneath a projector or platen opening 40 formed by the lower horizontal flanges on the main portions of the side plates 14 and 16, by the lower edge of the rear plate 20 and by the rear edge of the floor plate 22.

The front cover plate 18 is preferably also formed as a die cast member and projects forwardly sufficiently to provide a vertical wall 42 arranged to support a tubular extention 44 in which may be slidably positioned a tubular lens mount or objective 46. A transverse opening 48 is provided in the cover plate 18 adjacent the wall 42 and this opening serves to receive a slide carrier and its supporting frame, which may be of any conventional construction but which is preferably of the type shown and described in co-pending application Serial Number 746,920, filed May 9, 1947. The slide carrier frame may be secured in operative position by a set screw 49.

The projector is provided with a pair of condenser lenses 52 and 54 supported by suitable means (not shown) so as to be in optical alignment with the lens mount 46 and these lenses are of sufficient size to completely cover the area of a lantern slide or the like when positioned in opening 48. Illuminating means in the form of an incandescent bulb 60 is positioned in a socket 61 and this socket in turn is movably supported within the main portion 25 of the housing 12 by suitable means (not shown) so as to be selectively positioned in either an inclined position as indicated by the axis 62 for opaque projection or moved to an upright position as indicated by axis 64 for transparent projection. When the bulb is in its upright position, it will be in optical alignment with condenser lenses 52 and 54 and the objective 46. An optimum bulb positioned for illuminating opaque material at the opening 40 as well as for directing light toward a rear inclined reflector 78 and a pair of inclined side reflectors 80 has been found to be at about fifty-two degrees to the surface of the material positioned at opening 40. A projection lens system or objective 64 is provided in an upper portion of the housing 12 and arranged to be axially slidable relative thereto for projecting images of the opaque material positioned at opening 40 and axially aligned with this projection lens system is an inclined first surface mirror or reflector 66 arranged to direct light received from the material at opening 40 toward the projection lens system 64. The bulb 60 may be moved by any convenient manually operable means desired to and from its inclined and vertical positions.

The forced air ventilating system previously referred to is preferably provided in the form of a pair of centrifugal blowers 97 and 98 (see Fig. 2) spaced at opposite sides of the projector and arranged so as to communicate with the outside through flanged openings 99 formed in side plates 14 and 16. A centrally located motor 100 is provided with a shaft upon the opposite ends of which are carried said blowers. Each blower housing 102 which is formed by the vertical wall of the side plate 14 (or 16), flanges 104, 105, and 106 formed integrally with the side plate and by an inner sheet metal side member 107. These parts are so shaped as to form a more or less circular lower housing and a rearwardly directed duct which leads into a nozzle 108 at the side of the instrument. Since there is a nozzle at each side of the instrument and each is shaped so as to extend rearwardly and terminate in a relatively wide flat discharge opening or exit 110, the two nozzles together will direct the cooling air across all parts of the platen 38. The motor 100 is provided with a flanged mounting plate 112 at each end thereof for attachment to each side member 107 of the blower housings by clamping bolts or the like 114.

In order that the blowers 97 and 98 may operate continuously for cooling the interior of the projector while the bulb is lighted, it is necessary to provide suitable means for controlling the air blast from the blowers each time the platen 38 is moved away from the opening 40 for the insertion or removal of sheet material or the like adjacent this opening. For moving the platen, there is provided a U-shaped actuating member 120 which has a handle portion at 122 formed at the bite portion of this member. The member 120 is secured by means of a pair of stirrups 124 to a second shorter U-shaped member 126 which is in turn pivotally secured at its opposite ends by pivot pins or the like 128 to lugs formed integral with the blower casing flanges 104.

The U-shaped member 126 carries a pair of upstanding integral arms 132, one positioned between each pair of stirrups 124, and these arms are arranged to engage and support a pair of resilient strips 134 to the opposite ends of which are secured by suitable attaching means a channel-shaped sheet metal supporting member 136 which is open at its opposite sides and adapted to receive within the channelled portion thereof a picture card holder (not shown). Or upon this channel-shaped member 136 may be centered the platen 38 in such a way as to be detachably supported thereby. The strips 134 thus yieldably support the platen 38 for limited universal tilting movement such as may be desirable when a book or the like is being held by the platen against the housing 12 at opening 40. The platen 38 may be provided with bosses or the like 142 formed transversely upon its undersurface and in these bosses may be positioned a pair of U-shaped slidable frames 144 and 145. The arrangement is such that each frame member 144 and 145 may be moved outwardly to an extended position to provide additional supporting surface for large books or the like when positioned upon the platen 38 for projection purposes.

To the lower forwardly extending free ends of the U-shaped actuating member 120 are pivotally connected actuating bars or links 150. Each link has a slotted upper end 152 for sliding engagement with a pivot pin 154 carried at the free end of a lever 156 and each lever 156 is in turn carried upon an actuating shaft 158 for moving a draft control gate 160. (While a short shaft has been provided at each side of the projector in the preferred construction, it should be understood that these shafts could be replaced by a single longer shaft extending across the interior of the projector housing and arranged to actuate both draft control gates.) Each shaft 158 is mounted for pivotal movement in an opening formed in the member 107 and the side plate 14 (or 16) and is rigidly secured to its respective gate 160 so that rotation of the shaft in a clockwise direction, as viewed in Fig. 1, will cause the draft control gate or valve 160 normally located in an aperture formed between flanges 105 and 106 and between member 107 and the side plate 14 (or 16), to move from its normally elevated position to a downwardly inclined position indicated by the dotted lines 164 in Fig. 1 to close the passage in the duct leading from the blower to the discharge nozzle 108.

Each gate 160 is normally held in its elevated or aperture closing position by a tensioned spring 161 so that air from the blower will be caused to flow through the duct and nozzle 108 and toward the platen opening 40. However, when the gate 160 is swung by lever 156 to the dotted line position 164, the air blast will be shut off from the nozzle 108 and forced to travel upwardly through the aperture and into the housing at a location removed from opening 40. In this way, the air will be caused to circulate through other portions of the projector housing and thus provide a cooling effect therefor even though no appreciable draft is at such time directed toward opening 40.

When the projector bulb 60 is in a position for opaque projection, as shown in Fig. 1, and the handle 122 is moved downwardly a slight amount, the free ends of the U-shaped member 120 connected to links 150 will be caused to move upwardly into engagement with flanged plates 112 and thus the pivot means for the lower ends of links 150 will be moved into axial alignment with the pivot means 128 for the U-shaped member 126. This limited upward movement of the forward ends of the member 120 will cause the links 150 to swing levers 156 upwardly and this will in turn move gates 160 in opposition to a pair of relatively weak springs 161 into their respective lowered dotted line position 164.

After the draft through nozzles 108 has been thus shut off by the lowering of gates 160, further downward movement of the handle 122 against the action of a pair of relatively strong springs 170, secured to a cross bar 171 welded or otherwise secured to intermediate portions of the U-shaped member 126 and to suitable lugs 172 integral with the blower casing flange 104, will cause downward movement of the U-shaped member 126 which will allow platen 38 to move away from opening 40. Since no air will be issuing from the nozzles 108 as the platen opens, there will be no tendency for sheet material or the like which is to be projected at opening 40 to be ruffled, wrinkled, or blown out of its proper position upon the platen 38. Obviously, the draft control means and forced air ventilating system just described may be used in projectors adapted only for opaque projection.

A suitable electric connection, not shown, such as an electric plug, may be secured in or adjacent the side plate member 14 or 16 and flexible electrical connectors may be arranged to extend from this connection to the electric motor 100 and a similar pair arranged to extend from this connection to the socket 61 for the lamp 60. Also, if desired, a single switch could be provided upon the housing for controlling the supply of electrical energy to the motor and bulb.

When the bulb 60 has been moved from its inclined position to its upright position for transparent projection and the gate 160 is moved to its dotted line position 164, the air will be forced to flow out of the aperture in the blower casing 102 and will travel upwardly and about the condenser lenses and the slide carrier and into other adjacent portions of the housing. Some of the air will flow about the lamp 60 and may be expelled from the housing 12 through rear ventilator openings diagrammatically indicated at 180 and upper ventilator openings 181. Part of the heated air may be expelled through ventilator openings 183 formed in the top of the front plate 18 and a light shield 184 may be provided adjacent these last-mentioned openings. Some air may also pass down and out through a lower part of the housing 12 and thus provide some cooling for the motor 100.

A pair of adjustable stops 206 may be provided in a transverse brace 208 extending between the lower flanges of the side plates 14 and 16 and these adjustable stops arranged to serve as limiting means for the downward swinging movement of the lower forward ends of the U-shaped member 120 under the influence of gravity after complete return of the gates 160 to their normally raised position has been effected. Suitable means such as a catch 210, or means equivalent thereto, may be provided upon the housing 12 and arranged so as to engage a lower portion or portions of the U-shaped member 120 for holding same elevated. In this way, each gate 160 may be positively held in its dotted line position 164 when the projector is being used for transparent projection. In the construction, the handle 122 is arranged so as to function with a hand hole 19' formed in the front lower plate 19 by bending inwardly material thereof, as indicated at 19", and together serve as convenient means for lifting or moving the projector from place to place.

While the front plate 18 has been shown in the preferred construction, it will be appreciated that this plate together with the tubular support 44, the objective 46 and the condenser lenses 52 and 54, may be readily removed from the housing 12 and replaced by a plain transverse front plate when the projector is to be used for opaque projection only.

While the invention has been described in connection with opaque and transparent projectors of the types arranged to project an image onto a screen spaced at a distance from the projector, it should be noted that similar forced air ventilating means and draft control means could as readily be employed in opaque projectors of the type arranged to produce images of material upon a screen or plate carried directly upon the projector, such as might be employed in photographic enlargement or reducing equipment and the like.

A modified form of mechanism which may be employed for holding valve 160 in dotted line position 164 during transparent projection is shown in Fig. 4 and comprises an additional arm 212 on shaft 158 and pivoted thereto is a slotted link 214. To slotted link 214 is connected a lever 216 carried by a shaft 217 extending transversely of housing 12, and this shaft may have positioned upon each exposed end thereof suitable operating means, such as a knob 218. Link 214 and lever 216 may be moved from the position shown into a straight line position and thus hold gate or valve 160 down. But when in the position shown the valve 160, lever 212, and link 214 are free to move under the control of handle 122. Stops 220 and 222 limit the movement of link 214 and lever 216 in opposite directions.

Having described our invention, we claim:

1. A projector of the character described comprising a housing, an opening in a wall of said housing, a platen normally positioned adjacent said opening and arranged to support material adjacent said opening for opaque projection, means within said housing for illuminating material at said opening, an optical system comprising an objective for projecting an image of said material onto a surface spaced from said objective, a blower system connected to said housing, said blower system being arranged to normally blow cooling air toward said opening, a movably mounted member within said housing, and operator operable means operatively connected to said platen and to said movable member and arranged when moved from its inoperative position into a first operative position to move said movable member into a position reducing the flow of cooling air toward said opening while said platen remains stationary, and when subsequently moved from said first operative position into a second operative position to move said platen away from said opening while retaining said movable member in its last-named position.

2. A projector of the character described comprising a housing, an opening in a wall of said housing, a platen for closing said opening and arranged to support material adjacent said opening for opaque projection, means within said housing for illuminating material at said opening, an optical system comprising an objective for projecting an image of said material onto a surface spaced from said objective, a blower system connected to said housing, said blower system being arranged to normally below cooling air toward said opening while said illuminating means is illuminating said opening, a movably mounted air control member within said housing, platen supporting means carried by said housing and arranged to normally urge said platen toward said opening, and manually operable means operatively connected to said platen supporting means and to said air control member and arranged when moved from its inoperative position into a first operative position to move said air control member into a position reducing the flow of cooling air toward said opening while said platen remains stationary, and when subsequently moved from said first operative position into a second operative position to move said platen away from said opening while retaining said movable member in its last-named position.

3. A projector of the character described comprising a housing, an opening in a wall of said housing a platen for closing said opening and arranged to support material adjacent said opening for opaque projection, means within said housing for illuminating material at said opening, an optical system comprising an objective for projecting an image of said material onto a surface spaced from said objective, a blower system connected to said housing, said blower system being arranged to normally blow cooling air toward said opening while said illuminating means is illuminating said opening, a movably mounted air control member within said housing, platen supportng means for said platen carried by said housing and arranged to normally urge said platen toward said opening, an actuating member operatively connected to said air control member, and operator operable means pivotally connected intermediate its ends to said platen supporting means and at a point spaced therefrom to said actuating member and arranged when moved from an inoperative position into a first operative position to move said actuating member and thus air control member into a position reducing the flow of cooling air toward said opening while said platen and platen supporting means remain stationary, and when subsequently moved from said first operative position when subsequently moved into a second operative position to move said platen away from said opening while retaining said actuating member and said air control member in their last-named position.

4. A projector of the character described comprising a housing, an opening in a wall of said housing, a platen for closing said opening and arranged to support material adjacent said opening for opaque projection, means within said housing for illuminating material at said opening, an optical system comprising an objective for projecting an image of said material onto a surface spaced from said objective, a blower system connected to said housing, said blower system being arranged to normally blow cooling air toward said opening while said illuminating means is illuminating said opening, a movably mounted air control member within said housing, supporting means for said platen carried by said housing and arranged to normally urge said platen toward said opening, an arm for moving said air control member, an actuating bar connected to said arm, and an operating lever pivotally connected intermediate its ends to said platen supporting means and connected adjacent one of its ends to said bar, said operating lever being arranged for pivotal movement relative to said platen supporting means into a first operative position for actuating said bar and arm to move said air control member into a position reducing the flow of cooling air toward said opening, said operating lever and platen supporting means being arranged for subsequent movement relative to said housing for moving said platen away from said opening.

5. A projector of the character described comprising a housing, an opening in a wall of said housing, a platen for closing said opening and arranged to support material adjacent said opening for opaque projection, means within said housing for illuminating material at said opening, an optical system comprising an objective for projecting an image of said material onto a surface spaced from said objective, a blower system associated with said housing, said blower system including a duct within said housing arranged to normally blow cooling air toward said opening while said illuminating means is illuminating said opening, an aperture in a wall of said duct arranged to allow cooling air therein to escape into said housing at a location removed from said opening, a valve for normally closing said aperture, and operator operable means operatively connected to said platen and to said valve and arranged for movement into a first operative position to move said valve into a position reducing the flow of cooling air through said duct and toward said opening and allowing it to escape through said aperture into said housing, and arranged for subsequent movement into a second operative position to move said platen away from said opening.

6. A projector of the character described comprising a housing, an opening in a wall of said housing, a platen for closing said opening and arranged to support material adjacent said opening for opaque projection, means within said housing for illuminating material at said opening, an optical system comprising an objective for projecting an image of said material onto a surface spaced from said objective, a blower system associated with said housing, said blower system including a duct within said housing arranged to normally blow cooling air toward said opening while said illuminating means is illuminating said opening, an aperture in a wall of said duct arranged to allow cooling air therein to escape into said housing at a location removed from said opening, a valve for normally closing said operture, means for supporting said platen for movement relative to said housing, and operator operable means operatively connected to said platen supporting means and to said valve and arranged for movement into a first operative position to move said valve into a position reducing the flow of cooling air through said duct and toward said opening and allowing it to escape through said operture into said housing, and arrangtd for subsequent movement into a second operative position to move said platen supporting means and platen away from said opening.

7. A projector of the character described comprising a housing, an opening in a wall of said housing, a platen for closing said opening and arranged to support material adjacent said opening for opaque projection, means within said housing for illuminating material at said opening, an optical system comprising an objective for projecting an image of said material onto a surface spaced from said objective, a blower system associated with said housing, said blower system including a duct within said housing and a blower communicating therewith, said duct being arranged to direct cooling air from said blower toward said opening, an aperture in a wall of said duct for allowing the escape of cooling air from said duct into said housing at a location removed from said opening, a valve for closing said aperture, resilient means for urging said valve toward closed position, means for supporting said platen for movement relative to said housing, resilient means for urging said platen supporting means and platen toward said opening, and operator operable means operatively connected to said platen supporting means and to said valve and arranged for movement relative to said platen supporting means into a first operative position to positively move said valve into a position reducing the flow of cooling air toward said opening and allow it to escape through said aperture, said operator operable means being arranged for subsequent movement relative to said housing into a second operative position to move said platen supporting means and platen away from said opening.

8. A projector of the character described comprising a housing, an opening in a wall of said housing, a platen for closing said opening and arranged to support material adjacent said opening for opaque projection, means within said housing for illuminating material at said opening, an optical system including an objective for projecting an image of said material onto a surface spaced from said objective, a blower system associated with said housing, said blower system including a duct within said housing and a blower communicating therewith, said duct being arranged to direct cooling air from said blower toward said opening, an aperture in a wall of said duct for allowing the escape of cooling air from said duct into said housing at a location removed from said opening, a valve for closing said aperture, resilient means for urging said valve toward closed position, a platen supporting lever pivotally connected to said housing, resilient means for urging said platen supporting lever and platen toward said opening, a bar operatively connected to said valve, and an operating lever carried by said platen supporting lever and arranged for pivotal movement relative thereto, and connected to said bar for actuating same, said operating lever being arranged for pivotal movement relative to said platen supporting lever into a first operative position to move said bar and positively move said valve into a position reducing the flow of cooling air toward said opening, said operating lever also being arranged for subsequent movement with said platen supporting lever and relative to said housing into a second operative position to move said platen away from said opening.

9. A projector of the character described comprising a housing, a substantially horizontally disposed opening in a lower wall thereof, a platen for supporting material adjacent said opening for opaque projection, a reflector above said opening, a substantially horizontally disposed objective optically aligned with said reflector and said opening, a blower carried by said housing and arranged to force cooling air through said housing, a valve movably mounted within said housing and associated with said blower, means for normally holding said valve in a first position so as to direct cooling air toward said opening, an actuating member for actuating said valve to a second position for substantially preventing the flow of cooling air directly toward said opening, platen holding means normally resiliently urging said platen toward a position closing said opening, and a lever connected to said platen holding means and to said member and arranged to be moved by the operator in a predetermined manner to first causing said member to move said valve to its second position while said platen remains stationary and to subsequently cause said platen to move away from said opening while retaining said actuating member and valve in their last-named position.

10. A projector of the character described comprising a housing, a lens system carried by said housing, an opening in a lower wall of said housing, a platen for supporting material adjacent said opening for opaque projection, a reflector for reflecting light from said material toward said lens system, air draft means including a blower and an air duct having an exit arranged so as to direct cooling air toward said opening, an aperture in said duct at a location removed from said exit, a gate normally closing said aperture, and manually operable means connected to said gate and to said platen and arranged when moved to a predetermined position to first move said gate to a position closing said duct and opening said aperture and subsequently move said platen away from said opening.

11. A projector of the character described comprising a housing, a lens system carried by said housing, an opening in a lower wall of said housing, a platen for supporting material adjacent said opening for opaque projection, air draft means including a blower and an air duct having an exit arranged to direct cooling air toward said opening, an aperture in a wall of said duct for allowing cooling air therefrom to flow into said housing at a location removed from said opening, a gate, yieldable means for normally holding said gate in a position to close said aperture, a platen supporting member pivotally carried by said housing, yieldable means arranged to normally yieldably urge said supporting member and platen toward said opening, a manually operable lever hingedly carried by said platen supporting member and having a handle portion extending rearwardly of said platen and a second portion extending forwardly thereof, a link connected to said second portion and to said gate and arranged to move said gate to its duct closing position when said handle is moved to a first operative position, said handle being subsequently movable to a second operative position for moving said platen away from said opening while maintaining said gate in its duct closing position.

12. A projector of the character described comprising a housing shaped so as to form a main enclosure and an auxiliary enclosure projecting downwardly from a forward portion thereof, a pair of spaced centrifugal blowers positioned in said auxiliary enclosure and an electric motor between said blowers for actuating same, an opening in a lower wall of said main enclosure, a platen normally closing said opening and arranged to support material adjacent said opening for opaque projection, illuminating means in said housing, an air duct adjacent each side of the housing and terminating in a relatively wide flat nozzle adjacent said opening, said nozzles being arranged to jointly direct cooling air from said blowers toward substantially all parts of said opening, a valve associated with each duct and arranged to be moved into a duct closing position for reducing the flow of cooling air from the associated nozzle, and manually operable means including a handle near the rear of said housing operatively connected to said valves and said platen for first moving said valves to their duct closing position and for subsequently moving said platen away from said opening as said handle is moved to a predetermined position.

13. A projector of the character described comprising a housing shaped so as to form a main enclosure and an auxiliary enclosure projecting downwardly from a forward portion thereof, an opening in a lower wall of said main enclosure, a pair of spaced centrifugal blowers positioned in said auxiliary enclosure and an electric motor for actuating said blowers positioned therebetween, an opening in a lower wall of said main enclosure, a pair of ducts each arranged to direct cooling air from its associated blower toward the opening in said main enclosure, a platen for normally closing said opening and arranged to support material adjacent thereto, illuminating means in said housing, each of said ducts terminating in a relatively wide flat nozzle adjacent said opening, said nozzles being arranged to jointly spread the air coming from said blowers so as to flow toward substantially all parts of said opening, an aperture in each duct and a valve for normally closing each aperture, and operator operable means associated with each valve and with said plate and arranged when moved to a predetermined position to first move said valves to open said apertures and close said ducts and to subsequently move said platen away from said opening.

14. A projector of the character described comprising a housing, a lens system carried in axially adjustable relation to said housing, an opening in a wall of said housing, a platen for supporting material adjacent said opening for opaque projection, a ventilating system for cooling said housing, said ventilating system comprising a blower and an air duct having an exit within said housing and arranged to direct cooling air toward said opening, an aperture in a wall of said duct for allowing cooling air to flow into said housing at a location spaced from said opening, a gate, yieldable means for normally holding said gate in a position closing said aperture, a platen supporting member, pivotal means for connecting said member to said housing, yieldable means arranged to normally urge said platen and platen supporting member toward said opening, a lever hingedly carried intermediate its ends upon said platen supporting member so as to provide an operator control arm portion and an actuating arm portion, a link connected to said gate for moving said gate, and an operative connection between said actuating arm portion and said link, the parts being so constructed and arranged that when said control arm portion is moved to a first operative position the gate will be moved so as to reduce the air flow from said exit and said operative connection between said actuating arm portion and said link will be moved substantially into axial alignment with the pivotal means for said platen supporting member, and when said control arm portion is subsequently moved to a second operative position the platen and platen supporting member will be moved away from said opening while said gate is held in a position reducing said air flow.

15. A projector of the character described comprising a housing, an opening in a wall of said housing, a platen for supporting material adjacent said opening for opaque projection, an objective carried by said housing for projecting an image of said material, a passageway in said housing at a location spaced from said opening and arranged to receive film or the like for transparent projection, a second objective carried by said housing for projecting an image of said film, a ventilating system associated with said housing and including a duct within said housing and arranged to direct cooling air toward said opening, an aperture in a wall of said duct arranged to allow cooling air to flow into said housing in the general direction of said passageway, a valve for closing said aperture, resilient means for urging said valve toward closed position, a platen supporting lever pivotally connected to said housing, resilient means for urging said lever and platen toward said opening, a bar operatively connected to said valve, an operating lever pivotally carried by said platen supporting lever and operatively connected to said bar, said operating lever being movable relative to said supporting lever for actuating said bar and valve into a position for reducing the flow of cooling air toward said opening, and subsequently movable with said supporting lever so as to move said platen away from said opening, and manually operable means carried by said housing and arranged to releasably hold asid valve in a position to allow cooling air to flow through said aperture while said platen remains adjacent said opening.

16. A projector of the character described comprising a housing, an opening in a wall of said housing, a platen for supporting material adjacent said opening for opaque projection, an objective carried by said housing for projecting an image of said material, a passageway in said housing at a location spaced from said opening and arranged to receive film or the like for transparent projection, a second objective carried by said housing for projecting an image of said film, a ventilating system associated with said housing and including a duct within said housing and arranged to direct cooling air toward said opening, an aperture in a wall of said duct arranged to allow cooling air to flow into said housing in the general direction of said passageway, a valve for closing said aperture, resilient means for urging said valve toward closed position, a platen supporting lever pivotally connected to said housing, resilient means for urging said lever and platen toward said opening, a bar having a slotted portion operatively connected to said valve, an operating lever pivotally carried by said platen supporting lever and operatively connected to said bar, said operating lever being movable relative to said supporting lever for actuating said bar and valve into a position for reducing the flow of cooling air toward said opening, and subsequently movable with said supporting lever so as to move said platen away from said opening, and manually operable means carried by said housing and arranged to move said valve relative to said slotted bar and hold said valve in a position to allow cooling air to flow through said aperture while said platen remains adjacent said opening.

DAVID D. LOWBER.
ARTHUR J. KAVANAGH.

REFERENCES CITED

The following references are of record in the file of this patent:

UNITED STATES PATENTS

| Number | Name | Date |
| --- | --- | --- |
| 1,904,695 | Plies | Apr. 18, 1933 |
| 2,200,637 | Perkins et al. | May 14, 1940 |
| 2,283,268 | Kreinin | May 19, 1942 |
| 2,292,966 | Osterberg et al. | Aug. 11, 1942 |
| 2,328,616 | Cockburn | Sept. 7, 1943 |
| 2,332,691 | Blaisdell | Oct. 26, 1943 |
| 2,344,263 | Perkins | Mar. 14, 1944 |
| 2,395,561 | Osterberg et al. | Feb. 26, 1946 |